United States Patent [19]

Faber

[11] 4,439,916
[45] Apr. 3, 1984

[54] METHOD OF MAKING A COMPOSITE ELECTRODE

[75] Inventor: Peter Faber, Karlstein, Fed. Rep. of Germany

[73] Assignee: Rheinisch-Westfalisches Elektrizitätswerk Aktiengesellschaft, Essen, Fed. Rep. of Germany

[21] Appl. No.: 401,244

[22] Filed: Jul. 23, 1982

Related U.S. Application Data

[63] Continuation of Ser. No. 118,793, Feb. 5, 1980, abandoned, and a continuation-in-part of Ser. No. 885,180, Mar. 10, 1978, abandoned.

[30] Foreign Application Priority Data

Mar. 12, 1977 [DE] Fed. Rep. of Germany ....... 2710908

[51] Int. Cl.³ .............................................. H01M 4/22
[52] U.S. Cl. .................. 29/623.4; 29/623.5; 429/234; 156/73.1
[58] Field of Search ................. 29/623.4, 623.5, 623.1; 429/234, 136, 211, 4; 264/104, 272; 156/73.2, 73.4, 73.1; 228/1 R

[56] References Cited

U.S. PATENT DOCUMENTS

| | | | |
|---|---|---|---|
| 482,043 | 9/1892 | Kennedy et al. | 429/234 |
| 1,051,147 | 1/1913 | McDougall | 429/234 |
| 1,158,491 | 11/1915 | Handler | 429/234 |
| 2,515,204 | 7/1950 | Evans | 429/136 |
| 2,858,352 | 10/1958 | Solomon | 429/136 |
| 3,560,262 | 2/1971 | Baba et al. | 429/211 |
| 3,623,914 | 11/1971 | Carson, Jr. | 429/136 |
| 3,661,661 | 5/1972 | Berleyoung | 228/1 |
| 3,695,502 | 10/1972 | Gaiser | 228/1 |
| 3,772,089 | 11/1973 | Bennett et al. | 156/73.1 |
| 3,775,189 | 11/1973 | Jaggard | 156/73.1 |
| 3,890,160 | 6/1975 | Daniels, Jr. | 29/623.1 |
| 3,973,991 | 8/1976 | Cestaro et al. | 429/227 |
| 4,026,000 | 5/1977 | Anderson | 156/73.4 |
| 4,048,406 | 9/1977 | Sandera et al. | 429/209 |
| 4,052,541 | 10/1977 | von Krusenstierna | 429/233 |
| 4,055,711 | 10/1977 | Ikari | 429/143 |
| 4,090,897 | 5/1978 | Minick | 156/73.1 |

FOREIGN PATENT DOCUMENTS 1018971 2/1966 United Kingdom ............... 156/73.2

*Primary Examiner*—Daniel C. Crane
*Attorney, Agent, or Firm*—Karl F. Ross; Herbert Dubno

[57] ABSTRACT

A method of making composite electrode for use in a storage battery or other accumulator comprises disposing on opposite sides of a metal support provided with throughgoing openings respective synthetic-resin layers adapted to form pockets for the active mass. The synthetic-resin layers, in the form of screens, fabrics, grids or the like, are ultrasonically welded through the openings of the metal support together by the simultaneous application of mechanical pressure and ultrasonic energy. The active mass is then introduced into the pockets formed by the synthetic-resin layers which may be covered, if desired, by fine-porous cover layers applied by heat and pressure so as to weld these cover layers to the first-mentioned synthetic-resin layers.

4 Claims, 5 Drawing Figures

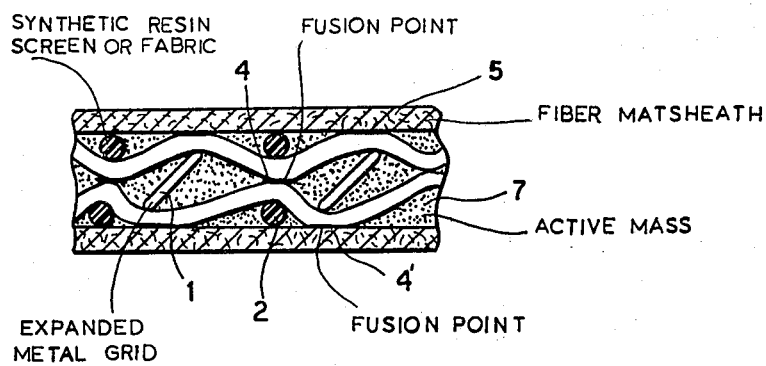
FIG. 3
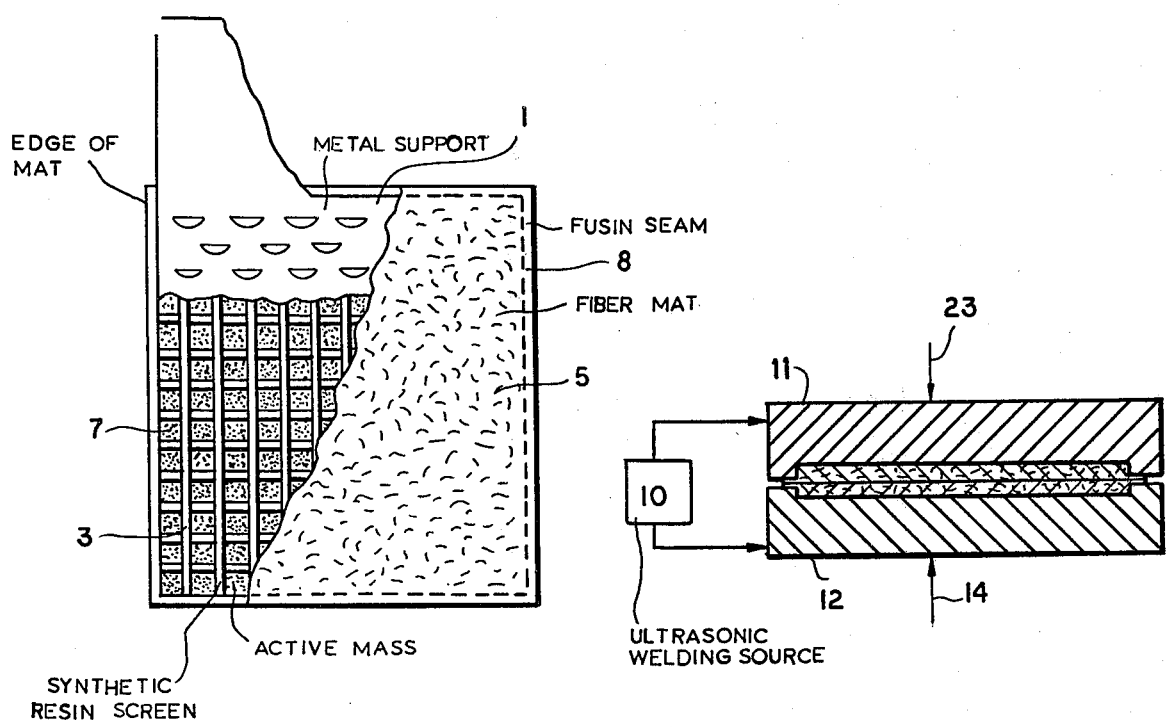
FIG. 4
FIG. 5

METHOD OF MAKING A COMPOSITE ELECTRODE

CROSS REFERENCE TO RELATED APPLICATIONS

This application is a continuation of Ser. No. 118,793 filed Feb. 5, 1980 and, in turn, a continuation of Ser. No. 885,180 filed Mar. 10, 1978, both now abandoned.

FIELD OF THE INVENTION

The present invention relates to a method of making a metal/synthetic resin composite electrode for storage batteries, accumulators and the like, e.g. lead-acid batteries, and, more particularly to a method of making an improved electrode assembly.

BACKGROUND OF THE INVENTION

It is known to provide, in the storage-battery or accumulator field, a composite electrode structure in which the active mass is received within synthetic-resin layers applied to opposite sides of a metal support, grid or current collector.

A prior-art system of this type is described in German published application (Auslegeschrift) 12 31 326. In this construction, the synthetic-resin layers are formed, e.g. from synthetic-resin particles to fibers which are sintered to the metal carrier. The bond between the synthetic resin and the metal is frequently poor and this is especially the case when the active material is mixed with the synthetic resin prior to its application to the carrier.

When less than 20 volume percent of synthetic resin is used in the mixture, one obtains a barely coherent and adherent structure capable of retaining the active mass. If one increases the proportion of the synthetic resin in the mixture, the resulting pores are relatively closed so that the access of electrolyte to the active material is limited.

During charge-discharge cycling, the active mass tends to swell and the resulting volume change causes the active mass to be shed from the electrode alone or together with the synthetic-resin material.

OBJECT OF THE INVENTION

It is the principal object of the present invention to provide an improved method of making a composite electrode in which the attachment of the synthetic-resin material to the metal support is improved and which will be less susceptible to volume changes during charge/discharge cycling or volume changes which arise will not cause loss of the active mass.

SUMMARY OF THE INVENTION

This object and others which will become apparent hereinafter are attained, in accordance with the invention, by a method of fabricating an electrode structure using a metal support provided with throughgoing openings. According to the invention, the synthetic-resin layers applied to each side of the support have the form of nets, screens, fabric, grids or other openwork configuration, the synthetic-resin layers being fused together within the openings of the support without material bonding directly to the latter. According to the invention, the simultaneous application of mechanical pressure and ultrasonic energy is used to fuse the two synthetic-resin layers together through the openings of the metal support.

According to a preferred embodiment of the invention, after the application of the active material, the basic electrode structure, consisting of the aforementioned synthetic-resin layers and the metal support, is encapsulated or sheathed by the application of fine-porous cover layers of synthetic resin using heat and pressure, the cover layers being thereby bonded to the first-mentioned synthetic-resin openworks.

It has been found to be advantageous to bond the cover layers on both sides of the electrode together along their edges and around the metal support. This completes the encapsulation of the metal support and the active mass together with the synthetic-resin openworks whose pockets receive the active material.

The active mass can be applied to the pockets of the synthetic-resin openworks as soon as these are integrated with the metal support and one another. It is, however, also possible to apply the active mass after the application of the cover layers.

More specifically, the invention comprises the initial formation of an assembly from a coarse openwork lead-alloy carrier or support, e.g. in the form of a plate-like electrode grid or expanded metal grid, to which the synthetic-resin layers are applied on opposite sides. The synthetic-resin layers, as noted previously, are openworks in the form of nets, screens, coarse-woven fabrics, knits or the like of synthetic-resin strands or monofilaments. The assembly thus provided is subjected to mechanical pressure and ultrasonic welding in an ultrasonic sonotrode and anvil assembly of conventional design.

The ultrasonic treatment is carried out for a period of about 1 to 2 seconds with ultrasonic energy at a frequency of 20,000 Hz. The pressure which is applied depends upon the tendency of the synthetic resin to flow and generally varies between 2 and 20 g/cm$^2$.

Surprisingly, the synthetic-resin layers on opposite sides of the metal carrier are readily deformed and contact one another within the openings of the metal support. They are therefore welded together at these contacting locations. The metal support itself is not bonded to the synthetic resin but merely covered thereby.

In the next process step, the active mass is applied to the pockets formed by the openwork of the synthetic-resin layers. The application of the active mass can be affected by any conventional technique, preferably either pasting or dry filling. Thereafter, the assembly can be subjected to a pressing step. When pasting using a moist or wet mixture, the assembly is then dried.

The last step of the process involves the bonding on both sides of fine-porous cover layers which can constitute the separators for the electrode in the accumulator, battery or other application to which the electrode is put. These fine-porous cover layers are composed of synthetic resin and are applied by hot pressing to the surface of the planar synthetic-resin openworks. The cover layers can contact these openworks at contact points or lines along the facial plane of the active mass and within the pockets of the openwork.

The application of the fine-porous layers which is effected by hot pressing, can bring about any desired compaction of the active mass in the electrode. The active mass is thus distributed in very small compartments in contact with the metal support and is completely encapsulated so that it is retained firmly in place.

It cannot therefore be dislodged downwardly or forwardly from the electrode.

In a variant of the process of the present invention, the cover layers are applied first and the active mass is formed within the pockets by immersing the electrode structure in a solution or suspension of the active material. In another alternative, the active mass can be formed electrochemically in situ within the pockets by electrodeposition techniques well known in the art.

By a final ultrasonic or heat pressing, using relatively higher pressures in the edge zones of the electrode, these edges can be compacted so as to be made more or less nonporous or in any event less porous so that the edges of the composite electrode are protected against any possible detrimental effects by the electrolyte flow or movement.

BRIEF DESCRIPTION OF THE DRAWING

The above and other objects, features and advantages of the present invention will become more readily apparent from the following description, reference being made to the accompanying drawing in which:

FIG. 3 is a cross-sectional view illustrating features of the invention, shown also in diagrammatic form;

FIG. 4 is a view similar to FIG. 2 but illustrating another feature of the invention; and FIG. 5 is a cross-sectional view through an apparatus for carrying out a process for making the electrode of FIGS. 1 through 4.

SPECIFIC DESCRIPTION

Figure 2:
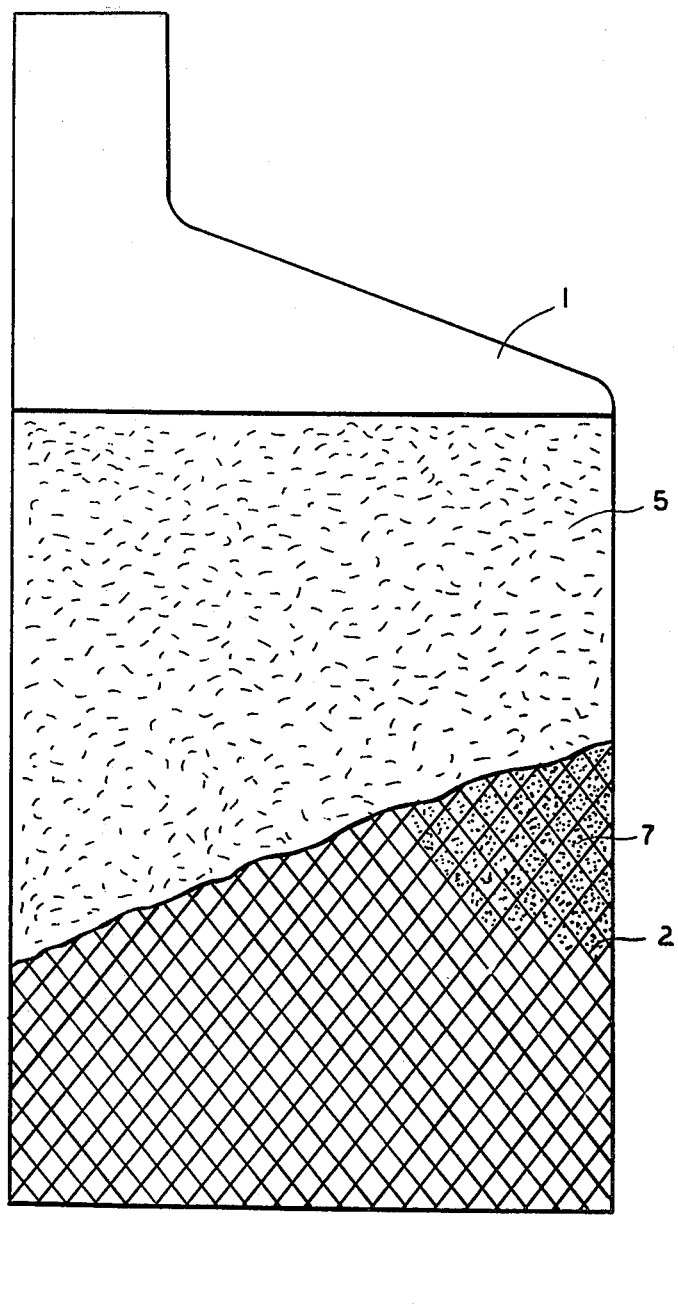
FIG. 2 is an elevational view of the electrode, partly broken away.
Figure 1:
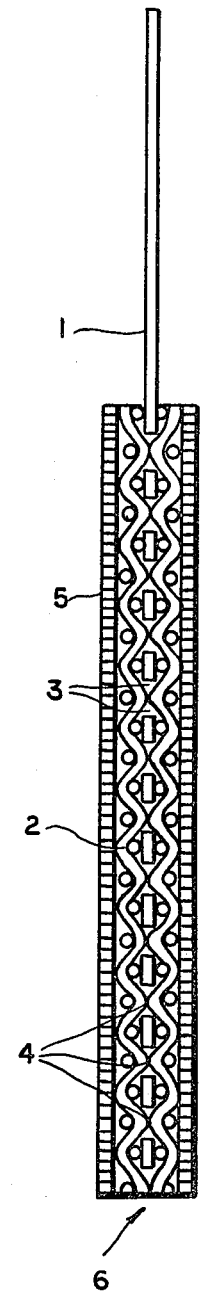
FIG. 1 is a vertical cross-sectional view through an electrode according to the invention, the portions thereof being shown in greatly enlarged scale and in diagrammatic form.

The composite electrodes shown in FIGS. 1 through 4 may be used for storage batteries or electrical accumulators in accordance with the examples given below. Basically, each electrode comprises a metal support or carrier 1, shown as a flat plate, provided with openings 3 in a surface distribution, these openings being throughgoing so that they are accessible from either side of the support.

On both sides of the support, there are provided respective synthetic-resin layers 2 formed from synthetic-resin filaments or strands and hence having an open configuration. These synthetic-resin layers 2 can be termed synthetic-resin openworks. The synthetic-resin layers 2 form pockets to receive the active mass which has been shown at 7 in the drawing. The active mass can be pasted in the pockets in a moist state and then permitted to dry or can be applied under pressure as a powder.

The synthetic-resin layers 2 are welded together at point welds 4 by ultrasonic energy and the application of pressure. The welds 4 are thus formed in the openings 3 of the metal support.

After the application of the active mass, the latter can be sheathed with fine-porous cover layers 5 of synthetic-resin material. The cover layers 5 can be nonwoven fiber fleeces or mats of the same or different synthetic-resin material as that constituting the underlying layers 2, the mats 5 being fused at points 4' to the underlying layer 2.

As can be seen from FIG. 3, the metal support may be an expanded metal grid in which the openings are formed by slitting the metal plate and then stretching the same to rotate portions of the plate between the slits at an angle to the plane of the plate.

The fusion points between the mats 5 and the screens 2 of synthetic-resin monofilament have been shown at 4' in greater detail in FIG. 3.

FIG. 4 shows that the edges of the mats 5 can extend beyond the outlines of the electrode so that they can be welded together and to any projecting portion of the grids or openworks 2 along these edges. The projecting edges are represented at 9 in FIG. 4 and the fusion seams at 8 around the edges of the metal support. The result is a continuous weld seam around the active mass fully encapculating the latter and represented at 6 in FIG. 1.

In FIG. 5 I have shown the fusion of the assembly of FIG. 4 together between a pair of platens 11 and 12 of an ultrasonic welding tool, pressure being applied in the direction of arrows 13 and 14 and the ultrasonic energy being delivered by the ultrasonic welding source 10.

SPECIFIC EXAMPLES

An expanded-metal plate of lead/calcium/tin alloy having dimensions, in the region to be covered by the active mass, of 70 by 120 mm and provided with openings which can each have an area of about 4 mm square, is used as the metal support. The metal plate has a thickness of about 1.3 mm and is covered on opposite sides with synthetic-resin screens of polypropylene having a thickness of 0.5 mm and a spacing of the strand of the screen of about 2 to 3 mm.

All three layers are ultrasonically welded together as illustrated in FIG. 5 with the application of a pressure of 10 to 30 g/cm$^2$ using a flat ultrasonic welding tool. Investigation shows that the two synthetic-resin grids are fused together at points within the openings of the metal support.

In a second ultrasonic welding operation, a nonwoven fiber mat of polyester fibers is fused to one side of the electrode assembly, i.e. to one of the synthetic-resin grids. To this assembly is applied, by doctoring, a moist paste of a positive active mass constituted of a lead/lead dioxide mixture. Such mixtures are commonly used in the storage-battery industry for lead-acid batteries. After drying, the open side of the assembly is sheathed by a second fine-porous polyester nonwoven mat which is ultrasonically welded to the synthetic-resin screen on the formerly open side of the structure. The active mass is thus distributed in the many small pockets of the synthetic-resin screens. The positive electrode is immersed in sulfuric acid and charged in the usual way.

EXAMPLE II

Using a conventional lead/antimony alloy grid for starting batteries having a thickness of 1.3 mm, the process described above is carried out with synthetic-resin webs on either side of this grid. The synthetic-resin layers or sheets have a thickness of 0.5 mm perforated with large openings having dimensions of about 3×3 mm.

EXAMPLE IIa

Using the grid of Example II and the perforated sheets described therein, the sheets are applied to the metal grid and the active mass is pasted in the openings of these sheets. After drying of the active mass, the lead/synthetic-resin structure is subjected to high energy ultrasonic fusion to bond the synthetic-resin sheets to one another through the openings in the grid. In a subsequent step, the two cover layers 5 are applied and welded to the synthetic-resin sheets and to one another along the edges of the electrode. Otherwise the electrode is formed up as described in Examples I and II.

EXAMPLE IIb

The procedure of Example II is followed except that the cover layers 5 are applied without previous welding of the synthetic-resin perforated sheets together and the entire assembly is fused ultrasonically together in a single step. In Examples IIa and IIb, the electrodes are formed up in sulfuric acid as described in Example I.

EXAMPLE III

The current collector is a nickel sheet or nickel grid having a thickness of 0.5 to 1.0 mm and the synthetic-resin screens are applied to opposite sides of the current collector as described in Example I. These synthetic-resin screens are welded together ultrasonically and the active mass is applied to the pockets formed by the synthetic-resin screens. The entire assembly is then dried and pressed.

Layers of polyolefin (polyethylene) powder are applied to each side of the electrode structure thus prepared and the assembly is pressed at a temperature of 150° to 250° C. to form the fine-porous layers in situ and encapsulate the active mass. The electrode is then anodically formed up in the usual manner.

The electrode structures which are made by the method of the present invention can be any of those described in the aforementioned copending application which is hereby included by reference in toto.

I claim:

1. A method of making a composite electrode for a storage battery or the like which comprises the steps of:
    applying to opposite sides of a metal support, formed with a surface distribution of throughgoing openings, respective flexible screen-like synthetic-resin openworks of filamentary material to form a resulting three-layered assembly;
    sandwiching the entire resulting assembly between a pair of rigid ultrasonic welding plates having juxtaposed surfaces substantially coextensive with said openworks;
    applying a mechanical pressure of substantially 2 to 20 g/cm$^2$ to said assembly by pressing said plates toward one another to deflect said openworks and simultaneously subjecting same to ultrasonic welding by applying ultrasonic energy at a frequency of about 20,000 Hz across said plates for a period of about 1 to 2 seconds and only long enough to bond the filaments thereof together through said openings without bonding said filaments to the metal support, said openworks forming interstices on opposite sides of said support;
    thereafter placing an active mass in said interstices and in contact with said support; and
    fusing, by the application of heat and pressure, respective fine-porous flexible cover layers of synthetic resin to said openworks, the active mass being deposited in said interstices before said cover layers are emplaced thereon whereby the active mass is densified by the pressure subsequently applied to said cover layers.

2. The method defined in claim 1, further comprising the step of welding said cover layers together along edges of the support.

3. The method defined in claim 1, further comprising the step of welding said openworks together along the edges of said support.

4. The method defined in claim 1 wherein said support consists of lead or lead alloy.

* * * * *